United States Patent
Yamada et al.

(10) Patent No.: US 12,509,609 B2
(45) Date of Patent: Dec. 30, 2025

(54) CURABLE RESIN COMPOSITION, RESIN CURED FILM, PARTITION WALL AND OPTICAL ELEMENT

(71) Applicant: AGC Inc., Tokyo (JP)

(72) Inventors: Kotaro Yamada, Tokyo (JP); Hiroyuki Mieno, Tokyo (JP); Naoko Shirota, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 18/795,738

(22) Filed: Aug. 6, 2024

(65) Prior Publication Data

US 2024/0392157 A1    Nov. 28, 2024

Related U.S. Application Data

(63) Continuation of application No. PCT/JP2023/002938, filed on Jan. 30, 2023.

(30) Foreign Application Priority Data

Feb. 7, 2022  (JP) .................................. 2022-017305

(51) Int. Cl.
| | |
|---|---|
| *B32B 3/10* | (2006.01) |
| *C08G 59/17* | (2006.01) |
| *C08G 59/24* | (2006.01) |
| *C08G 59/66* | (2006.01) |
| *C09D 163/10* | (2006.01) |
| *H10D 86/40* | (2025.01) |
| *H10D 86/60* | (2025.01) |
| *H10K 59/10* | (2023.01) |

(52) U.S. Cl.
CPC .............. *C09D 163/10* (2013.01); *B32B 3/10* (2013.01); *C08G 59/1466* (2013.01); *C08G 59/245* (2013.01); *C08G 59/66* (2013.01); *H10D 86/40* (2025.01); *H10D 86/60* (2025.01); *H10K 59/10* (2023.02)

(58) Field of Classification Search
CPC .. C08G 59/66; C08G 59/245; C08G 59/1455; B32B 3/10; B32B 27/20
See application file for complete search history.

(56) References Cited

U.S. PATENT DOCUMENTS

| | | |
|---|---|---|
| 2015/0234273 A1 | 8/2015 | Matsuura et al. |
| 2020/0369606 A1 | 11/2020 | Okumura et al. |

FOREIGN PATENT DOCUMENTS

| | | |
|---|---|---|
| JP | 2011-84479 A | 4/2011 |
| JP | 2011-102829 A | 5/2011 |
| JP | 2019-85403 A | 6/2019 |
| WO | WO 2014/084279 A1 | 6/2014 |

OTHER PUBLICATIONS

International Search Report issued Apr. 11, 2023 in PCT/JP2023/002938 filed Jan. 30, 2023, 2 pages.

*Primary Examiner* — Elizabeth E Mulvaney
(74) *Attorney, Agent, or Firm* — Oblon, McClelland, Maier & Neustadt, L.L.P.

(57) ABSTRACT

A curable resin composition contains a polyfunctional thiol compound. The polyfunctional thiol compound satisfies the following property (1) or property (2): (1) there is no CH structure two atoms next to an S atom; (2) in a compound obtained by adding ethylene to all SH groups in the polyfunctional thiol compound, an electrical charge of a hydrogen atom bonded to a carbon atom which is two atoms next to an S atom is 0.265 or less, as determined by natural population analysis after structural optimization based on a density functional theory.

13 Claims, No Drawings

CURABLE RESIN COMPOSITION, RESIN CURED FILM, PARTITION WALL AND OPTICAL ELEMENT

TECHNICAL FIELD

The present invention relates to a curable resin composition, a cured resin film, a partition wall, and an optical element.

BACKGROUND ART

In the production of optical elements such as an organic EL (electro-luminescence) element, a pattern printing method using an organic layer such as a light emitting layer as dots by an inkjet (IJ) method may be used. In such a method, the dots are formed in a desired pattern by providing a partition wall along outlines of the dots to be formed, injecting an ink containing a material of the organic layer into a section (hereinafter, also referred to as an "opening") surrounded by the partition wall, and drying and/or heating the ink.

In the above method, in order to prevent the ink from mixing between adjacent dots and to apply the ink uniformly during dot formation, an upper surface of the partition wall needs to have ink repellency, while the opening for forming dots surrounded by the partition wall, including side surfaces of the partition wall, needs to have an ink-philic property.

Therefore, in order to obtain a partition wall having ink repellency on the upper surface, there is known a method in which a curable resin composition containing an ink repellent is used to form a partition wall corresponding to a pattern having dots by, for example, photolithography.

Here, attempts have been made to incorporate a thiol compound into the curable resin composition for various purposes. For example, Patent Literature 1 discloses a negative photosensitive resin composition containing a resin or monomer having an ethylenic double bond, and a thiol compound having three or more mercapto groups in one molecule for the purpose of improving crosslinking properties. In addition, Patent Literature 2 discloses a positive photosensitive agent solution containing a quinonediazide-based photosensitive agent and a thiol compound for the purpose of preventing precipitation of the quinonediazide-based photosensitive agent.

CITATION LIST

Patent Literature

Patent Literature 1: WO 2014/084279
Patent Literature 2: JP2011-102829A

SUMMARY OF INVENTION

Technical Problem

Here, for example, in the case of producing an organic EL element by using an inkjet method, inkjet printing is performed using an ink containing a light emitting material or the like on openings of the partition wall, and then there is a step of heating and drying under a reduced pressure at about 200° C. It is known that outgassing that may occur at this time can deteriorate the organic EL element.

An object of the present invention is to provide a curable resin composition which reduces occurrence of outgassing after curing and from which a cured resin film having excellent heat resistance can be obtained, a cured resin film and a partition wall having excellent heat resistance obtained from the composition, and an optical element including the partition wall.

Solution to Problem

The inventors of the present invention have found that occurrence of outgassing can be reduced when a thiol compound satisfies specific conditions.

The present invention relates to the following [1] to [14].

[1] A curable resin composition containing a polyfunctional thiol compound, in which the polyfunctional thiol compound satisfies the following property (1) or property (2):
  (1) there is no CH structure two atoms next to an S atom;
  (2) in a compound obtained by adding ethylene to all SH groups in the polyfunctional thiol compound, an electrical charge of a hydrogen atom bonded to a carbon atom which is two atoms next to an S atom is 0.265 or less, as determined by natural population analysis after structural optimization based on a density functional theory.

[2] The curable resin composition according to [1], in which an SH group in the polyfunctional thiol compound is at least one of a secondary SH group and a tertiary SH group.

[3] The curable resin composition according to [1] or [2], in which the polyfunctional thiol compound has a structure represented by the following formula (1):

[Chem. 1]

(1)

[definitions of symbols in the above formula are as follows:
  X: divalent organic group selected from —C(=O)—, —C(=O)O—, —C(R)(C≡N)—, and —C(R)(NR₂)
  R: each independently hydrogen atom or monovalent organic group having 1 to 5 carbon atoms
  dashed line: hydrogen bond
  A: cyclic structure having 5 to 7 members].

[4] The curable resin composition according to any one of [1] to [3], in which the polyfunctional thiol compound has a 2-mercaptoalkyl ester structure shown in the following formula (1-11a) or a 4-mercaptoalkyl ester structure shown in the following formula (1-11b):

[Chem. 2]

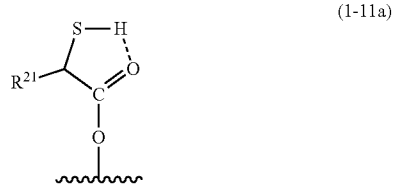

(1-11a)

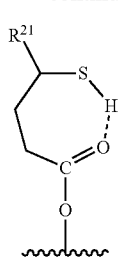

(1-11b)

[definitions of symbols in the above formula are as follows:
R$^{21}$: methyl group or ethyl group
dashed line: hydrogen bond].

[5] The curable resin composition according to any one of [1] to [4], in which the polyfunctional thiol compound has a 2-mercaptopropionate ester structure shown in the following formula (1-11a-i) or a 4-mercaptopentanoate ester structure shown in the following formula (1-11b-i).

[Chem. 3]

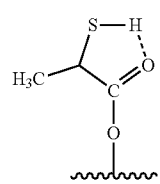

(1-11a-i)

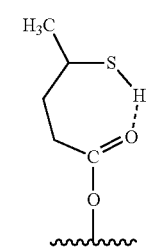

(1-11b-i)

[6] The curable resin composition according to any one of [1] to [5], in which the polyfunctional thiol compound contains one or more compounds selected from compounds represented by the following formula (2-2), formula (2-4), formula (2-5), and formula (2-6):

[Chem. 4]

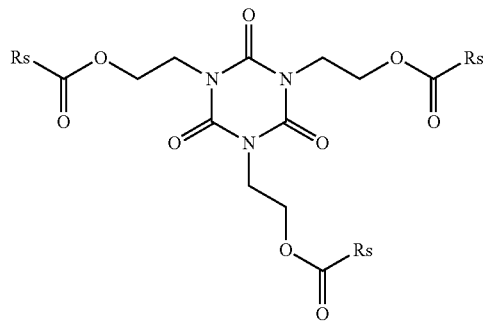

(2-2)

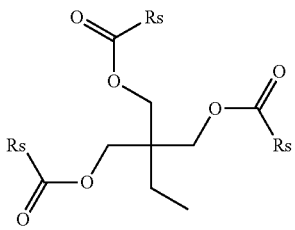

(2-4)

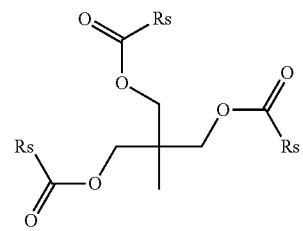

(2-5)

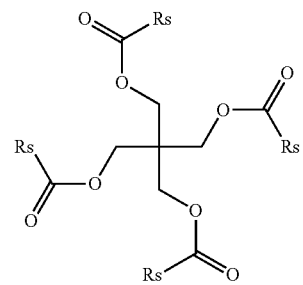

(2-6)

[definitions of symbols in the above formula are as follows:
Rs: each independently monovalent group represented by any of the following formulas (Rs-1) to formula (Rs-3)].

[Chem. 5]

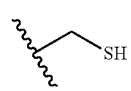

(Rs-1)

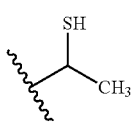

(Rs-2)

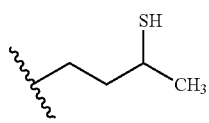

(Rs-3)

[7] The curable resin composition according to any one of [1] to [6], further containing: an alkali-soluble resin having an ethylenic double bond or an alkali-soluble monomer having an ethylenic double bond.

[8] The curable resin composition according to any one of [1] to [7], further containing: a colorant.

[9] The curable resin composition according to any one of [1] to [8], further containing: an ink repellent.

[10] The curable resin composition according to any one of [1] to [9], further containing: a polymerizable monomer having a plurality of allyl groups.

[11] The curable resin composition according to any one of [1] to [10], which is used for a partition wall, a hard coat, or an interlayer insulation film.

[12] A cured resin film formed by the curable resin composition according to any one of [1] to [10].

[13] A partition wall including:
the cured resin film according to [12], in which the partition wall is formed in a form of partitioning a surface of a base material into a plurality of sections for forming dots.

[14] An optical element including:
a plurality of dots on a surface of a base material; and a partition wall located between adjacent dots, in which the partition wall is the partition wall according to [13].

Advantageous Effects of Invention

According to the present invention, it is possible to provide a curable resin composition which reduces occurrence of outgassing after curing and from which a cured resin film having excellent heat resistance can be obtained, a cured resin film and a partition wall having excellent heat resistance obtained from the composition, and an optical element including the partition wall.

DESCRIPTION OF EMBODIMENTS

In the present description, a "(meth)acryloyl group" is a general term for a "methacryloyl group" and an "acryloyl group". This also applies to (meth)acryloyloxy group, (meth)acrylic acid, (meth)acrylate, (meth)allyl, (meth)acrylamide, and (meth)acrylic resin.

In the present description, a structure represented by a formula (x) may be simply referred to as a structure (x).

In the present description, a compound represented by a formula (y) may be simply referred to as a compound (y).

In the present description, a "side chain" is a group other than a hydrogen atom or a halogen atom that is bonded to a carbon atom constituting a main chain in a polymer in which repeating units constitute the main chain.

In the present description, a "total solid content of a curable resin composition" refers to a component that forms a cured resin film to be described later among components contained in the curable resin composition, and is determined from a residue obtained by heating the curable resin composition at 60° C. for 24 hours and removing the solvent. Note that, an amount of the total solid content can also be calculated based on an amount charged.

In the present description, a film made of a cured product of a composition whose main component is a resin is referred to as a "cured resin film".

In the present description, a film obtained by coating a curable resin composition is called a "coating film", and a film obtained by drying the coating film is called a "dry film". A film obtained by curing the "dry film" is a "cured resin film". In the present description, the "cured resin film" is sometimes simply referred to as a "cured film".

The cured resin film may be in the form of a partition wall formed to partition a predetermined section into a plurality of regions. For example, the following "ink" is injected into a section partitioned by a partition wall, that is, an opening surrounded by the partition wall, and a "dot" is formed.

In the present description, "ink repellency" refers to the property of repelling the above ink, and includes both water repellency and oil repellency. The ink repellency can be evaluated, for example, by using a contact angle when an ink is dropped. An "ink-philic property" is a property that is contradictory to the ink repellency, and, like the ink repellency, can be evaluated by using the contact angle when an ink is dropped. Alternatively, the ink-philic property can be evaluated by evaluating a degree of wetting and spreading of an ink (wetting and spreading property of the ink) when the ink is dropped based on a predetermined criterion.

In the present description, the "dot" refers to the smallest region in an optical element that can be modulated with light. In optical elements such as an organic EL element, a color filter for liquid crystal elements, and an organic TFT array, in the case of black and white display, 1 dot=1 pixel, and in the case of color display, for example, 3 dots (R (red), G (green), and B (blue))=1 pixel.

Hereinafter, embodiments of the present invention are described. Note that, in the present description, unless otherwise specified, % represents mass %.

[Curable Resin Composition]

A curable resin composition according to the present invention contains a polyfunctional thiol compound satisfying the following property (1) or property (2). (1) there is no CH structure two atoms next to an S atom (2) in a compound obtained by adding ethylene to all SH groups in the polyfunctional thiol compound, an electrical charge of a hydrogen atom bonded to a carbon atom which is two atoms next to an S atom is 0.265 or less, as determined by natural population analysis after structural optimization based on a density functional theory (Polyfunctional Thiol Compound (C))

The curable resin composition according to the present invention contains a polyfunctional thiol compound. In the case where the curable resin composition according to the present invention is, for example, a negative photosensitive resin composition, during exposure, radicals of the polyfunctional thiol compound (C) are generated by radicals generated from a photopolymerization initiator (B) to be described later, and a so-called thiol-ene reaction occurs that acts on an ethylenic double bond of an alkali-soluble resin or an alkali-soluble monomer (A) or a crosslinking agent (E) to be described later. Unlike radical polymerization of general ethylenic double bonds, the thiol-ene reaction has a high chain transfer property because of not being inhibited caused by oxygen, and has advantages such as a small shrinkage rate in obtaining a cured product and easy obtaining of a uniform network since crosslinking is also performed at the same time as polymerization.

In particular, in the case of forming a cured film having liquid repellency using a curable resin composition, since sufficient curing is performed even in an upper layer portion including an upper surface of the cured film, which is particularly susceptible to reaction inhibition caused by oxygen, it is possible to impart favorable ink repellency to the upper surface of the cured film.

However, as described above, a cured resin film made of a curable resin composition containing a polyfunctional thiol compound may undergo outgassing after curing.

Therefore, the polyfunctional thiol compound in the present invention satisfies the property (1) or the property (2). (1) there is no CH structure two atoms next to an S atom (2) in a compound obtained by adding ethylene to all SH groups in the polyfunctional thiol compound, an electrical charge of a hydrogen atom bonded to a carbon atom which is two atoms next to an S atom is 0.265 or less, as determined by natural population analysis after structural optimization based on a density functional theory.

In the case where the curable resin composition according to the present invention is, for example, a negative photosensitive resin composition, as described above, the polyfunctional thiol compound can form a crosslinked structure through an addition reaction with an ethylenic double bond during exposure. In the case where the curable resin composition is a positive photosensitive resin composition, the polyfunctional thiol compound can also form a crosslinked structure through an addition reaction with an ethylenic double bond, for example, in a thermosetting step during photolithography. Here, when a highly reactive hydrogen atom is bonded to the carbon atom two atoms next to the S atom, a reactant after the addition reaction is likely to be desorbed at a high temperature, leading to the occurrence of outgassing or the possibility of a decrease in heat resistance of the reactant. With a polyfunctional thiol compound satisfying the property (1) or the property (2), since the reactant after the addition reaction does not contain a highly reactive hydrogen atom, a cured product having reduced occurrence of outgassing and high heat resistance is obtained.

That is, when the polyfunctional thiol compound satisfying the property (1) or the property (2) is contained, a cured resin film having excellent heat resistance and reduced occurrence of outgassing after curing can be obtained while taking advantage of the polyfunctional thiol compound.

In the property (2), the electrical charge is an index indicating the reactivity of the hydrogen atom, and the larger the electrical charge, the higher the reactivity.

The natural population analysis can be performed using quantum chemical calculation software Gaussian 16, after structural optimization by DFT (B3LYP/6-31G (d)) using NBO version 3.1 (NBO Version 3.1, E. D. Glendening, A. E. Reed, J. E. Carpenter, and F. Weinhold).

In order for the polyfunctional thiol compound to satisfy the property (1) or the property (2), for example, a partial structure shown in a formula (1-11a) or a partial structure shown in a formula (1-11b) to be described below is included, that is, in a polyfunctional thiol compound having an ester bond, the SH group is bonded to a carbon atom other than a carbon atom at the β position, preferably to a carbon atom at the α position or γ position, among carbon atoms forming the ester bond.

The polyfunctional thiol compound preferably has a partial structure represented by the following formula (1).

[Chem. 6]

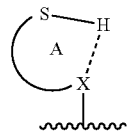

(1)

[Definitions of symbols in the above formula are as follows.
X: divalent organic group selected from —C(=O)—, —C(=O)O—, —C(R)(C≡N)—, and —C(R)(NR$_2$)
R: each independently hydrogen atom or monovalent organic group having 1 to 5 carbon atoms
dashed line: hydrogen bond
A: cyclic structure having 5 to 7 members]

The formula (1) represents that a cyclic structure having 5 to 7 members is formed by forming a hydrogen bond between the hydrogen atom in the SH group and the oxygen atom or the nitrogen atom in the divalent organic group X. The SH group in such a cyclic structure has a high chain transfer property and is highly effective in preventing curing inhibition caused by oxygen. As a result, the surface curability of the obtained cured product can be improved.

The structure represented by the formula (1) is more preferably a structure represented by the following formula (1-1) or a structure represented by the following formula (1-2). Since the organic group X containing —C(=O)— has a higher ability to form a hydrogen bond with the —SH group than —C≡N or —NR$_2$, a higher chain transfer property can be obtained.

[Chem. 7]

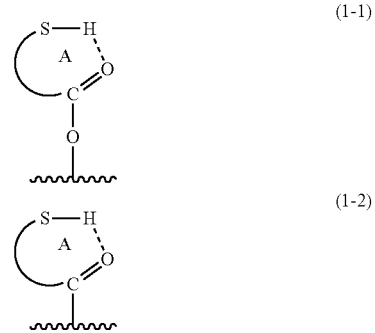

[Definitions of symbols in the above formula are as follows.
dashed line: hydrogen bond
A: cyclic structure having 5 to 7 members]

The structure represented by the formula (1-1) is more preferably a structure represented by the following formula (1-11).

[Chem. 8]

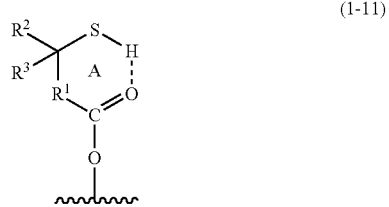

[Definitions of symbols in the above formula are as follows.
$R^1$: single bond, —CR$^{11}$R$^{12}$— or —CR$^{13}$R$^{14}$—CR$^{15}$R$^{16}$—
$R^{11}$ to $R^{16}$: each independently hydrogen atom or alkyl group having 1 to 4 carbon atoms
$R^2$: a hydrogen atom or an alkyl group having 1 to 4 carbon atoms
$R^3$: a hydrogen atom or an alkyl group having 1 to 4 carbon atoms
dashed line: hydrogen bond
A: cyclic structure having 5 to 7 members]

In the formula (1-11), when $R^{11}$ to $R^{16}$, $R^2$, or $R^3$ is an alkyl group, the alkyl group may be linear or branched.

$R^1$ is preferably a single bond or —CR$^{13}$R$^{14}$—CR$^{15}$R$^{16}$—. Accordingly, as to be described later, the polyfunctional thiol compound easily satisfies the property (1) or the property (2). —CR$^{13}$R$^{14}$—CR$^{15}$R$^{16}$— is particularly preferably —CH$_2$CH$_2$—.

In the formula (1-11), examples of $R^2$ and $R^3$ each independently include a hydrogen atom, a methyl group, or an ethyl group. Among them, a hydrogen atom or a methyl group is preferred from the viewpoint of having little steric hindrance and improving the chain transfer property of the SH group.

In the formula (1-11), the ring A is more preferably a cyclic structure having 5 or 7 members. In the case of 5 members, since $R^1$ is a single bond, the structure represented by the formula (1-11) is an α-thiol structure. In the case of 7 members, since $R^1$ is an ethylene skeleton, the structure represented by the formula (1-11) is a γ-thiol structure. Since the α-thiol structure and the γ-thiol structure easily satisfy the above property (1) or property (2), the occurrence of outgassing can be reduced by using a polyfunctional thiol having such a structure.

The structure represented by the formula (1-2) is more preferably a structure represented by the following formula (1-21).

[Chem. 9]

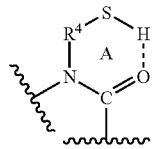

(1-21)

[Definitions of symbols in the above formula are as follows.

$R^4$: single bond, —$CR^{41}R^{42}$— or —$CR^{43}R^{44}$—$CR^{45}R^{46}$—

$R^{41}$ to $R^{46}$: each independently hydrogen atom or alkyl group having 1 to 4 carbon atoms dashed line: hydrogen bond A: cyclic structure having 5 to 7 members]

In the formula (1-21), when $R^4$ is —$CR^{41}R^{42}$—, it is preferable that one of $R^{41}$ and $R^{42}$ be a hydrogen atom and the other be an alkyl group having 1 to 4 carbon atoms since the SH group becomes secondary. In the case where $R^4$ is —$CR^{43}R^{44}$—$CR^{45}R^{46}$—, when it is $CR^{45}R^{46}$ that is bonded to SH, it is preferable that one of $R^{45}$ and $R^{46}$ be a hydrogen atom and the other be an alkyl group having 1 to 4 carbon atoms since the SH group becomes secondary.

In the polyfunctional thiol compound in the present invention, the SH group is preferably at least one of a secondary SH group and a tertiary SH group from the viewpoint of obtaining a curable resin composition having high storage stability.

In the polyfunctional thiol compound in the present invention, the SH group is preferably at least one of a primary SH group and a secondary SH group from the viewpoint of obtaining a curable resin composition having high crosslinking reactivity.

It is particularly preferable that all SH groups be secondary, since a curable resin composition having excellent storage stability and crosslinking reactivity can be obtained.

Specific examples of the partial structure preferably possessed by the polyfunctional thiol compound include a 2-mercaptoalkyl ester structure shown in the following formula (1-11a) and a 4-mercaptoalkyl ester structure shown in the following formula (1-11b).

As shown below, when the SH group in the polyfunctional thiol compound is bonded to a carbon atom at the α position or γ position of the carbon atoms forming the ester bond, in a reactant after the addition reaction between a thiol and an ethylenic double bond, since a highly reactive hydrogen atom does not bond to the carbon atom two atoms adjacent to the S atom, the polyfunctional thiol compound easily satisfies the above property (1) or property (2).

[Chem. 10]

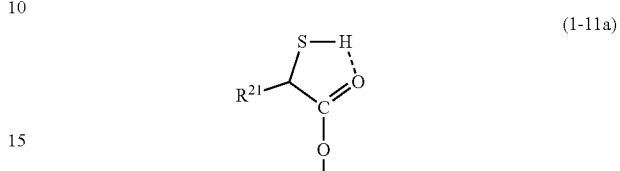

(1-11a)

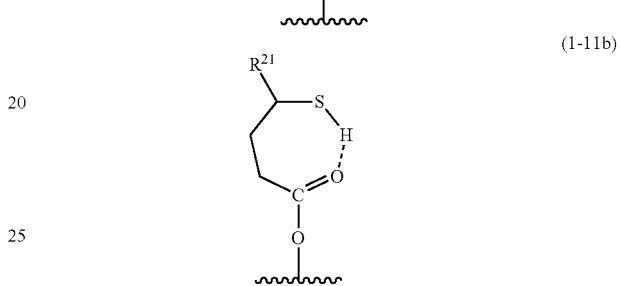

(1-11b)

[Definitions of symbols in the above formula are as follows.

$R^{21}$: methyl group or ethyl group dashed line: hydrogen bond].

Among them, a 2-mercaptopropionate ester structure shown in the following formula (1-11a-i) and a 4-mercaptopentanoate ester structure shown in the following formula (1-11b-i) are particularly preferred.

[Chem. 11]

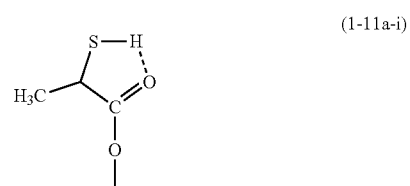

(1-11a-i)

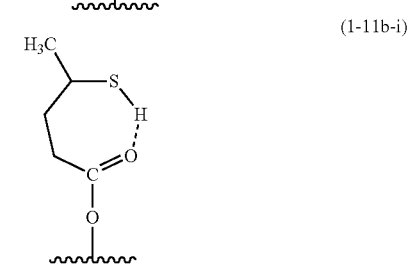

(1-11b-i)

The number of the SH groups in the polyfunctional thiol compound is preferably 2 to 10, and more preferably 3 to 6 in one molecule from the viewpoint of the storage stability of the curable resin composition.

The molecular weight of the polyfunctional thiol compound is not particularly limited. In the case where the curable resin composition according to the present invention has photocurability, a mercapto group equivalent (hereinafter, also referred to as an "SH equivalent") represented by

[molecular weight/number of mercapto groups] in the polyfunctional thiol compound is preferably 40 to 1,000, more preferably 40 to 500, and particularly preferably 40 to 250, from the viewpoint of curability at a small exposure amount.

The polyfunctional thiol compound is preferably an ester of mercaptocarboxylic acid and a polyhydric alcohol or a glycoluril derivative. The polyfunctional thiol compound may be an aliphatic compound or an aromatic compound.

Examples of the mercaptocarboxylic acid include thioglycolic acid, 2-mercaptopropionic acid, 2-mercapto-2-methylpropionic acid, 3-mercaptopropionic acid, 3-mercapto-2-methylpropionic acid, 2-mercaptobutanoic acid, 2-mercapto-2-methylbutanoic acid, 2-mercapto-3-methylbutanoic acid, 3-mercaptobutanoic acid, 3-mercapto-2-methylbutanoic acid, 3-mercapto-3-methylbutanoic acid, 4-mercaptobutanoic acid, 4-mercapto-2-methylbutanoic acid, 4-mercapto-3-methylbutanoic acid, 2-mercaptopentanoic acid, 2-mercapto-2-methylpentanoic acid, 2-mercapto-3-methylpentanoic acid, 2-mercapto-4-methylpentanoic acid, 3-mercaptopentanoic acid, 3-mercapto-2-methylpentanoic acid, 3-mercapto-3-methylpentanoic acid, 3-mercapto-4-methylpentanoic acid, 4-mercaptopentanoic acid, 4-mercapto-2-methylpentanoic acid, 4-mercapto-3-methylpentanoic acid, 4-mercapto-4-methylpentanoic acid, 5-mercaptopentanoic acid, 5-mercapto-2-methylpentanoic acid, 5-mercapto-3-methylpentanoic acid, and 5-mercapto-4-methylpentanoic acid.

Examples of the polyhydric alcohol include alcohols having 3 or more hydroxy groups, for example, glycerin, diglycerin, trimethylolethane, trimethylolpropane, triethylolethane, triethylolpropane, ditrimethylolpropane, tris(2-hydroxyethyl)isocyanurate, hexanetriol, sorbitol, pentaerythritol, dipentaerythritol, and sucrose.

More preferred examples of the polyfunctional thiol compound include compounds represented by the following formula (2-1) to formula (2-7). Note that, the polyfunctional thiol compound may be used alone or in combination of two or more thereof.

[Chem. 12]

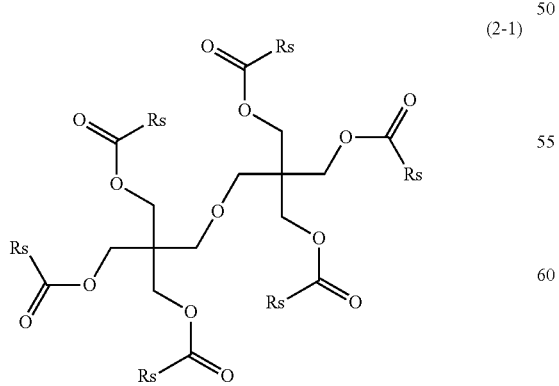

(2-1)

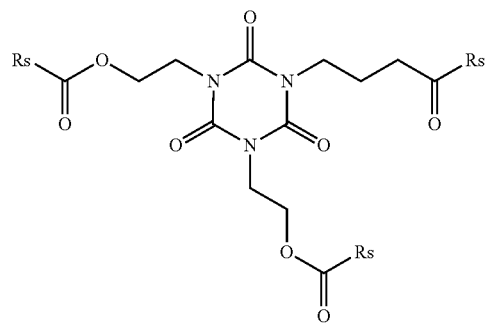

(2-2)

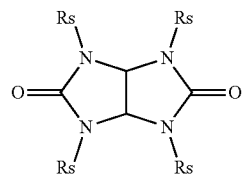

(2-3)

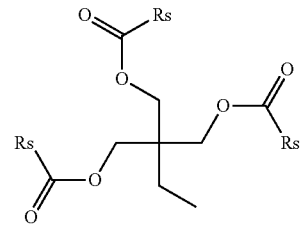

(2-4)

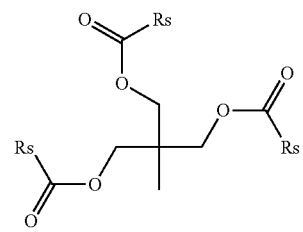

(2-5)

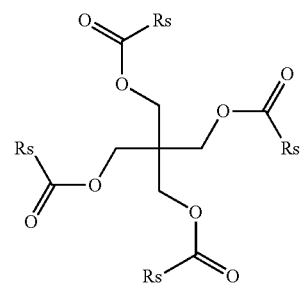

(2-6)

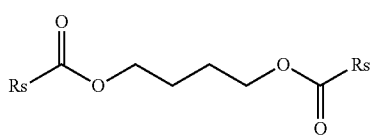

(2-7)

In the above formula (2-1) to formula (2-7), Rs is a thiol group-containing group, and is a monovalent group represented by any of the following formula (Rs-1) to formula (Rs-3). A plurality of Rs' in the formula (2-1) may be same as or different from each other. The same applies to a plurality of Rs' in the formula (2-2) to the formula (2-7). Rs is preferably a monovalent group represented by the formula (Rs-2) or the formula (Rs-3).

[Chem. 13]

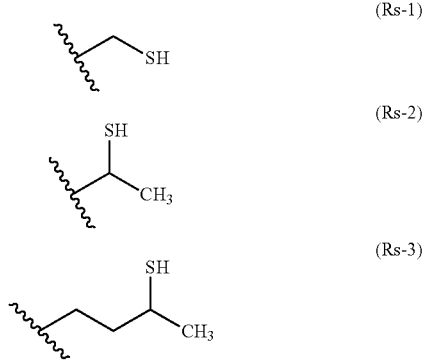

The polyfunctional thiol compound in the present invention can be produced with reference to known methods described in JP2011-84479A, JP2019-85403A, JP2019-85403A, or the like.

The curable resin composition according to the present invention contains a polyfunctional thiol compound such that the mercapto group in the compound is preferably 0.0001 to 1 mole, more preferably 0.0005 to 0.5 moles, and particularly more preferably 0.001 to 0.5 moles per mole of the ethylenic double bond in the total solid content in the curable resin composition. When the content is within the above range, in the case where the curable resin composition has photocurability, the photocurability and the developability are favorable even at a small exposure amount.

The curable resin composition according to the present invention may be a photocurable resin composition or a thermosetting resin composition.

The curable resin composition according to the present invention may also be a negative photosensitive resin composition or a positive photosensitive resin composition.

[Negative Photosensitive Resin Composition]

Hereinafter, an embodiment in which the curable resin composition according to the present invention is a negative photosensitive resin composition is described.

(Alkali-soluble Resin or Alkali-soluble Monomer (A))

The curable resin composition according to the present invention in the case of being a negative photosensitive resin composition preferably further contains an alkali-soluble resin (AP) having an ethylenic double bond or an alkali-soluble monomer (AM) having an ethylenic double bond.

The alkali-soluble resin (AP) having an ethylenic double bond is preferably a curable resin having an acidic group and an ethylenic double bond in one molecule. When the alkali-soluble resin (AP) has an ethylenic double bond in the molecule, an exposed portion of the photocurable resin composition is polymerized and cured by radicals generated from the photopolymerization initiator (B) to be described later. At this time, the polyfunctional thiol compound (C) generates radicals, which, due to a high chain transfer property thereof, act well on the above ethylenic double bond and contribute to polymerization and crosslinking, thereby achieving sufficient curing.

The exposed portion that has been sufficiently cured in this way cannot be removed using an alkaline developer. In addition, when the alkali-soluble resin (AP) has an acidic group in the molecule, a non-exposed portion of the uncured photocurable resin composition can be selectively removed using an alkaline developer. As a result, the cured resin film can be formed into a partition wall in the form of partitioning a predetermined section into a plurality of regions.

Examples of the acidic group include a carboxy group, a phenolic hydroxy group, a sulfo group, and a phosphoric acid group, and these may be used alone or in combination of two or more thereof.

Examples of the ethylenic double bond include double bonds having addition polymerizability such as a (meth)acryloyl group, an allyl group, a vinyl group, a vinyloxy group, and a vinyloxyalkyl group. These may be used alone or in combination of two or more thereof. Note that, a part or all of the hydrogen atoms included in the ethylenic double bond may be substituted with an alkyl group such as a methyl group.

Examples of the alkali-soluble resin (AP) having an ethylenic double bond include a resin (A-1) having a side chain having an acidic group and a side chain having an ethylenic double bond, and a resin (A-2) having an acidic group and an ethylenic double bond introduced into an epoxy resin. These may be used alone or in combination of two or more thereof.

The resin (A-1) can be synthesized, for example, by the following method (i) or (ii).

(i) A monomer having a reactive group other than an acidic group, for example, a reactive group such as a hydroxy group and an epoxy group, in the side chain, and a monomer having an acidic group in the side chain are copolymerized to obtain a copolymer having a side chain having a reactive group and a side chain having an acidic group. Next, this copolymer is reacted with a compound having a functional group that can be bonded to the above reactive group and an ethylenic double bond. Alternatively, a monomer having an acidic group such as a carboxy group in the side chain is subjected to copolymerization, and then a compound having a functional group that can be bonded to the acidic group and an ethylenic double bond is reacted in an amount that allows the acidic group remains after the reaction.

(ii) A monomer having a reactive group other than the acidic group in the side chain similar to the above (i) is reacted with a compound having a functional group that can be bonded to this reactive group and a protected ethylenic double bond. Next, this monomer is copolymerized with a monomer having an acidic group in the side chain, and then the protection of the ethylenic double bond is removed. Alternatively, a monomer having an acidic group in the side chain and a monomer having a protected ethylenic double bond in the side chain are copolymerized, and then the protection of the ethylenic double bond is removed.

Note that, (i) and (ii) are preferably performed in a solvent.

Among the above methods, the method (i) is preferably used. Hereinafter, the method (i) is specifically described.

Examples of the monomer having a hydroxy group as a reactive group include 2-hydroxyethyl (meth)acrylate, 2-hydroxypropyl (meth)acrylate, neopentyl glycol mono(meth)acrylate, glycerin mono(meth)acrylate, 2-hydroxyethyl vinyl ether, 2-hydroxyethyl allyl ether, N-hydroxymethyl (meth)acrylamide, and N, N-bis(hydroxymethyl)(meth)acrylamide.

In the case of using the monomer having a hydroxy group as a reactive group, examples of the monomer having an acidic group to be copolymerized therewith include a monomer having a carboxy group to be described later, and 2-(meth)acryloyloxyethyl phosphate as a monomer having a phosphoric acid group. Copolymerization of the monomer having a hydroxy group as a reactive group and the monomer having an acidic group can be performed by a well known method.

Examples of the compound having a functional group that can be bonded to the hydroxy group and an ethylenic double bond, which is to be reacted with the obtained copolymer, include an acid anhydride having an ethylenic double bond, a compound having an isocyanate group and an ethylenic double bond, and a compound having an acyl chloride group and an ethylenic double bond.

Examples of the acid anhydride having an ethylenic double bond include maleic acid anhydride, itaconic acid anhydride, citraconic acid anhydride, methyl-5-norbornene-2,3-dicarboxylic acid anhydride, 3,4,5,6-tetrahydrophthalic acid anhydride, cis-1,2,3,6-tetrahydrophthalic acid anhydride, and 2-buten-1-ylsuccinic acid anhydride.

Examples of the compound having an isocyanate group and an ethylenic double bond include 2-(meth)acryloyloxyethyl isocyanate, and 1,1-bis((meth)acryloyloxymethyl)ethyl isocyanate.

Examples of the compound having an acyl chloride group and an ethylenic double bond include (meth)acryloyl chloride.

Examples of the monomer having an epoxy group as a reactive group include glycidyl (meth)acrylate and 3,4-epoxycyclohexylmethyl (meth)acrylate.

As the monomer having an acidic group to be copolymerized with the monomer having an epoxy group as a reactive group, monomers same as described above for the monomer having a hydroxy group as a reactive group can be used. Copolymerization of the monomer having an epoxy group as a reactive group and the monomer having an acidic group can also be performed by a well known method.

Examples of the compound having a functional group that can be bonded to the epoxy group and an ethylenic double bond, which is to be reacted with the obtained copolymer, include a compound having a carboxy group and an ethylenic double bond. Specific examples of such a compound include (meth)acrylic acid, vinyl acetic acid, crotonic acid, itaconic acid, maleic acid, fumaric acid, cinnamic acid, salts thereof, and a monoester in the case of a dibasic acid. Note that, a carboxy group may be introduced into the resin (A-1) by reacting the hydroxy group generated here with an acid anhydride in which a dehydration condensation portion of the carboxylic acid forms a part of the cyclic structure.

Examples of the monomer having a carboxy group as a reactive group include (meth)acrylic acid, vinyl acetic acid, crotonic acid, itaconic acid, maleic acid, fumaric acid, cinnamic acid, salts thereof, and a monoester in the case of a dibasic acid. Note that, these monomers are also used as the above monomer having an acidic group.

In the case of using the monomer having a carboxy group as a reactive group, this monomer is polymerized as described above. Examples of the compound having a functional group that can be bonded to the carboxy group and an ethylenic double bond, which is to be reacted with the obtained polymer, include a compound having an epoxy group and an ethylenic double bond. Examples of such a compound include glycidyl (meth)acrylate and 3,4-epoxycyclohexylmethyl (meth)acrylate. Note that, in this case, the amount of the compound having a functional group that can be bonded to the carboxy group and an ethylenic double bond, which is to be reacted with a polymer having a carboxy group, is such that the carboxy group, as an acidic group, remains in the side chain in the polymer after the reaction.

The resin (A-2) can be synthesized by reacting an epoxy resin with a compound having a carboxy group and an ethylenic double bond, to be described later, and then reacting the resultant with a polycarboxylic acid or an anhydride thereof.

Specifically, an ethylenic double bond is introduced into the epoxy resin by reacting the epoxy resin with the compound having a carboxy group and an ethylenic double bond. Next, a carboxy group can be introduced by reacting the epoxy resin into which the ethylenic double bond has been introduced with a polycarboxylic acid or an anhydride thereof.

The epoxy resin is not particularly limited, and thereof include a bisphenol A type epoxy resin, a bisphenol F type epoxy resin, a phenol novolac type epoxy resin, a cresol novolac type epoxy resin, a trisphenolmethane type epoxy resin, an epoxy resin having a naphthalene skeleton, an epoxy resin having a biphenyl skeleton represented by the following formula (A-2a), a fluorenyl-substituted bisphenol A type epoxy resin represented by the following formula (A-2b), and an epoxy resin having a biphenyl skeleton represented by the following formula (A-2c).

[Chem. 14]

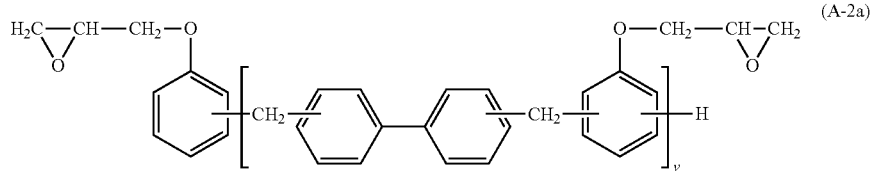

(A-2a)

(v is an integer of 1 to 50, and preferably an integer of 2 to 10. The hydrogen atoms in the benzene ring may be each independently substituted with an alkyl group having 1 to 12 carbon atoms, a halogen atom, or a phenyl group in which some of the hydrogen atoms may be substituted with a substituent.)

[Chem. 15]

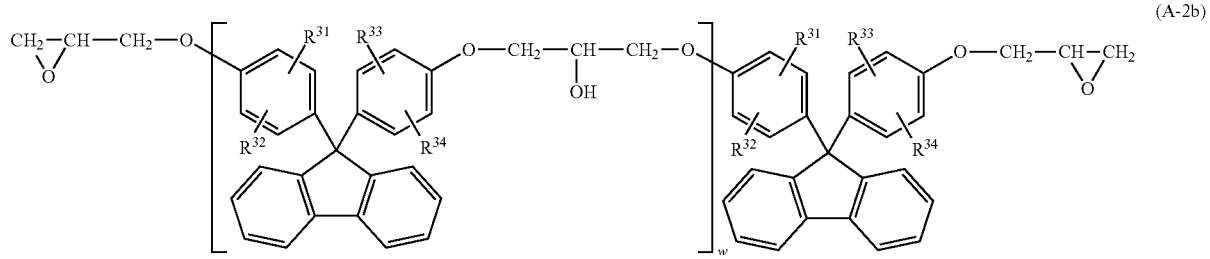

(A-2b)

($R^{31}$, $R^{32}$, $R^{33}$, and $R^{34}$ are each independently a hydrogen atom, a chlorine atom, or an alkyl group having 1 to 5 carbon atoms, and w is 0 or an integer of 1 to 10.)

[Chem. 16]

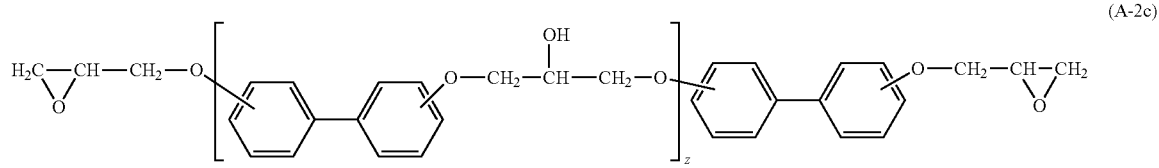

(A-2c)

(The hydrogen atoms in the benzene ring may be each independently substituted with an alkyl group having 1 to 12 carbon atoms, a halogen atom, or a phenyl group in which some of the hydrogen atoms may be substituted with a substituent. z is 0 or an integer from 1 to 10.)

Note that, in the case where the epoxy resin represented by the formulas (A-2a) to (A-2c) is reacted with the compound having a carboxy group and an ethylenic double bond, and then a polycarboxylic acid anhydride is reacted, it is preferable to use a mixture of dicarboxylic acid anhydride and tetracarboxylic acid dianhydride as the polycarboxylic acid anhydride.

The compound having a carboxy group and an ethylenic double bond is preferably (meth)acrylic acid, vinyl acetic acid, crotonic acid, itaconic acid, maleic acid, fumaric acid, cinnamic acid, salts thereof, or a monoester in the case of a dibasic acid, and particularly preferably (meth)acrylic acid.

As the alkali-soluble resin (AP) having an ethylenic double bond, the resin (A-2) is preferably used from the viewpoint of preventing peeling off of the cured film during development and obtaining a high-resolution dot pattern, from the viewpoint of favorable linearity of the pattern when the dots are linear, and from the viewpoint of easily obtaining a smooth surface of the cured film.

The resin (A-2) is particularly preferably a resin in which an acidic group and an ethylenic double bond are introduced into a bisphenol A type epoxy resin, a resin in which an acidic group and an ethylenic double bond are introduced into a bisphenol F type epoxy resin, a resin in which an acidic group and an ethylenic double bond are introduced into a phenol novolac type epoxy resin, a resin in which an acidic group and an ethylenic double bond are introduced into a cresol novolac type epoxy resin, a resin in which an acidic group and an ethylenic double bond are introduced into a trisphenolmethane type epoxy resin, or a resin in which an acidic group and an ethylenic double bond are introduced into the epoxy resin represented by the formulas (A-2a) to (A-2c).

As the alkali-soluble monomer (AM) having an ethylenic double bond, for example, a monomer (A-3) having a side chain having an acidic group and a side chain having an ethylenic double bond is preferably used. The acidic group and the ethylenic double bond are similar to those in the alkali-soluble resin (AP) having an ethylenic double bond.

Examples of the monomer (A-3) include 2,2,2-triacryloyloxymethylethylphthalic acid.

The alkali-soluble resin or the alkali-soluble monomer (A) having an ethylenic double bond contained in the photocurable resin composition may be used alone or in combination of two or more thereof.

The content of the alkali-soluble resin or the alkali-soluble monomer (A) having an ethylenic double bond in the total solid content of the photocurable resin composition is preferably 5 mass % to 80 mass %, and particularly preferably 10 mass % to 60 mass %. When the content is within the above range, the photocurable resin composition has favorable photocurability and developability.

(Photopolymerization Initiator (B))

In the case where the curable resin composition according to the present invention has photocurability, it preferably further contains a photopolymerization initiator (B). The photopolymerization initiator (B) is not particularly limited as long as it is a compound that has a function as a photopolymerization initiator, and is preferably a compound that generates radicals by exposure to light.

Examples of the photopolymerization initiator (B) include: α-diketones such as methylphenylglyoxylate and 9,10-phenanthrenequinone; acyloins such as benzoin; acyloin ethers such as benzoin methyl ether, benzoin ethyl ether, and benzoin isopropyl ether; thioxanthones such as thioxanthone, 2-chlorothioxanthone, 2-methylthioxanthone, 2,4-dimethylthioxanthone, isopropylthioxanthone, and 2,4-diethylthioxanthone; benzophenones such as benzophenone, 4,4'-bis(dimethylamino) benzophenone, and 4,4'-bis(diethylamino)benzophenone; acetophenones such as acetophenone, 2-(4-toluenesulfonyloxy)-2-phenylacetophenone, p-dimethylaminoacetophenone, 2,2'-dimethoxy-2-phenylacetophenone, p-methoxyacetophenone, 2-methyl-1-[4-(methylthio)phenyl]-2-morpholinopropan-1-one, and 2-benzyl-2-dimethylamino-1-(4-morpholinophenyl)-butan-1-one; quinones such as anthraquinone, 2-ethylanthraquinone, camphorquinone, and 1,4-naphthoquinone; aminobenzoic acids such as ethyl 2-dimethylaminobenzoate and (n-butoxy)ethyl 4-dimethylaminobenzoate; halogen compounds such as phenacyl chloride and trihalomethylphenyl sulfone; acylphosphine oxides such as bis(2,4,6-trimethylbenzoyl)-phenylphosphine oxide; peroxides such as di-t-butyl peroxide; oxime esters such as 1,2-octanedione,1-[4-(phenylthio)-,2-(O-benzoyloxime), and ethanone 1-[9-ethyl-6-(2-methylbenzoyl)-9H-carbazol-3-yl]-1-(O-acetyloxime); and aliphatic amines such as triethanolamine, methyldiethanolamine, triisopropanolamine, n-butylamine, N-methyldiethanolamine, and dicthylaminocthyl methacrylate.

Among the photopolymerization initiator (B), benzophenones, aminobenzoic acids, and aliphatic amines are preferably used in combination with other radical initiators since they may exhibit a sensitizing effect.

The photopolymerization initiator (B) is preferably 2-methyl-1-[4-(methylthio)phenyl]-2-morpholinopropan-1-one, 2-benzyl-2-dimethylamino-1-(4-morpholinophenyl)-butan-1-one, 1,2-octanedione, 1-[4-(phenylthio)-,2-(O-benzoyloxime), ethanone 1-[9-ethyl-6-(2-methylbenzoyl)-9H-carbazol-3-yl]-1-(O-acetyloxime), or 2,4-diethylthioxanthone. Further, a combination of these with benzophenones, for example, 4,4'-bis(diethylamino)benzophenone is particularly preferred.

The photopolymerization initiator (B) may be used alone or in combination of two or more thereof.

The content of the photopolymerization initiator (B) in the total solid content of the curable resin composition is preferably 0.1 mass % to 50 mass %, more preferably 0.5 mass % to 30 mass %, and particularly preferably 5 mass % to 20 mass %. When the content is within the above range, the curable resin composition has favorable photocurability and developability.

(Ink Repellent (D))

The curable resin composition according to the present invention preferably further contains an ink repellent (D).

The ink repellent (D) has the property of migrating to the upper surface (upper surface migratory property) and ink repellency during the process of forming a cured film using the curable resin composition. When the ink repellent (D) is used, the upper layer portion including the upper surface of the obtained cured film becomes a layer in which the ink repellent (D) is densely present (hereinafter, may be referred to as an "ink repellent layer"), and the ink repellency is imparted to the upper surface of the cured film.

From the viewpoint of the upper surface migratory property and the ink repellency, the ink repellent (D) having the above properties preferably contains a fluorine atom.

The content of the fluorine atom in the ink repellent (D) preferably 1 mass % to 40 mass %, more preferably 5 mass % to 35 mass %, and particularly preferably 10 mass % to 30 mass %. When the content of the fluorine atom in the ink repellent (D) is equal to or greater than the lower limit value of the above range, favorable ink repellency can be imparted to the upper surface of the cured film, and when the content is equal to or smaller than the upper limit value of the above range, compatibility with other components in the curable resin composition is improved.

The ink repellent (D) is preferably a compound having an ethylenic double bond. When the ink repellent (D) has an ethylenic double bond, radicals of the polyfunctional thiol compound (C) act on the ethylenic double bond of the ink repellent (D) that has migrated to the upper surface, and the ink repellent (D) can be (co)polymerized with another ink repellent (D) or with another component having an ethylenic double bond contained in the curable resin composition and/or crosslinked via the polyfunctional thiol compound (C).

Accordingly, in the production of a cured film by curing the curable resin composition, the fixation of the ink repellent (D) in the upper layer portion of the cured film, i.e., in the ink repellent layer, can be improved.

When the curable resin composition according to the present invention contains the polyfunctional thiol compound (C), even in the case where the exposure amount during exposure is small, the ink repellent (D) can be sufficiently fixed to the ink repellent layer. In the case where the ink repellent (D) has an ethylenic double bond, the above applies. In the case where the ink repellent (D) does not have an ethylenic double bond, the ink repellent (D) can be sufficiently fixed by sufficiently curing a photocurable component mainly composed of the alkali-soluble resin or the alkali-soluble monomer (A) present around the ink repellent (D).

Generally, in the case where the ethylenic double bond undergoes radical polymerization, the surface of the cured film or the partition wall in contact with the atmosphere is more susceptible to reaction inhibition caused by oxygen, but the radical reaction caused by the polyfunctional thiol compound (C) is hardly inhibited by oxygen, which is therefore particularly advantageous for fixing the ink repellent (D) at a small exposure amount. Further, in the production of the partition wall, the ink repellent (D) can be sufficiently prevented from being detached from the ink repellent layer or the upper surface of the ink repellent layer can be sufficiently prevented from being peeled off during development.

Examples of the ink repellent (D) include an ink repellent (D1) made of a partial hydrolysis condensate of a hydrolyzable silane compound and having a fluorine atom, and an ink repellent (D2) made of a compound whose main chain is a hydrocarbon chain and whose side chain contains a fluorine atom.

The ink repellent (D1) and the ink repellent (D2) may be used alone or in combination. In the curable resin composition according to the present invention, it is particularly preferable to use the ink repellent (D1) since it has excellent ultraviolet light/ozone resistance.

Specifically, the ink repellents described in WO 2014/084279, WO 2015/093415, and the like can be used as the ink repellent (D1) and the ink repellent (D2).

The content of the ink repellent (D) in the total solid content of the curable resin composition is preferably 0.01 mass % to 15 mass %, more preferably 0.01 mass % to 5 mass %, and particularly preferably 0.03 mass % to 1.5 mass %. When the content is equal to or greater than the lower limit value of the above range, the upper surface of the cured film formed from the curable resin composition has excellent ink repellency. When the content is equal to or smaller than the upper limit value of the above range, the adhesion between the cured film and the base material is improved.

(Crosslinking Agent (E))

The curable resin composition according to the present invention may further contain a crosslinking agent (E). The crosslinking agent (E) is a compound having two or more ethylenic double bonds in one molecule and having no acidic group. When the curable resin composition contains the crosslinking agent (E), the curability of the curable resin composition during exposure is improved, and a cured film can be formed even with a small exposure amount.

Among them, from the viewpoint of favorable reactivity with a polyfunctional thiol compound, a compound (E1) having two or more allyl groups in one molecule is preferred. The number of allyl groups in the compound (E1) is preferably 2 to 10, and more preferably 2 to 6.

Examples of the compound (F1) include trimeth(allyl) cyclohexane, tri(meth)allyl (iso)cyanurate, di(meth)allyl monoglycidyl (iso)cyanurate, 3,9-di(meth)allyl-2,4,8,10-tetraoxaspiro[5.5]undecane, di(meth)allyl phthalate, di(meth) allyl isophthalate, di(meth)allyl terephthalate, di(meth)allyl maleate, di(meth)allyl fumarate, di(meth)allyl-endo-methylene tetrahydrophthalic anhydride, tri(meth)allyl trimellitate, pentaerythritol tetra(meth)allyl ether, pentaerythritol tri(meth)allyl ether, and tetra(meth)allyl glycoluril. From the viewpoint of good diffusibility in a developer and further reduction in residues at openings, triallyl isocyanurate is particularly preferred.

Examples of the crosslinking agent (E) other than the compound (E1) include diethylene glycol di(meth)acrylate, trimethylolpropane tri(meth)acrylate, pentaerythritol tri (meth)acrylate, pentaerythritol tetra(meth)acrylate, ditrimethylolpropane tetra(meth)acrylate, dipentaerythritol penta (meth)acrylate, dipentaerythritol hexa(meth)acrylate, ethoxylated isocyanuric acid tri(meth)acrylate, tris-(2-acryloxyethyl)isocyanurate, ε-caprolactone-modified tris-(2-acryloxyethyl)isocyanurate, and urethane acrylate.

From the viewpoint of photoreactivity, it is preferable to have a large number of ethylenic double bonds. For example, pentaerythritol tetra(meth)acrylate, ditrimethylolpropane tetra(meth)acrylate, dipentaerythritol hexa(meth) acrylate, dipentaerythritol penta(meth)acrylate, ethoxylated isocyanuric acid tri(meth)acrylate, or urethane acrylate is preferred.

The crosslinking agent (E) may be used alone or in combination of two or more thereof.

The content of the crosslinking agent (E) in the total solid content of the curable resin composition is preferably 10 mass % to 70 mass %, and particularly preferably 20 mass % to 60 mass %.

Note that, in the case where the compound (E1) having two or more allyl groups in one molecule is contained, the content of the compound (E1) in the total solid content is preferably 1 mass % to 50 mass %, and particularly preferably 5 mass % to 40 mass %. The compound (E1) is preferably trimeth(allyl)cyclohexane, tri(meth)allyl (iso) cyanurate, and 3,9-di(meth)allyl-2,4,8,10-tetraoxaspiro[5.5] undecane, and particularly preferably trimeth(allyl)cyclohexane and 3,9-di(meth)allyl-2,4,8,10-tetraoxaspiro[5.5] undecane. When the content is within the above range or when the compound is the above compound, the obtained curable resin composition has favorable photocurability and developability, and the partition wall formed has sufficiently reduced residues at the openings. Further, in the case of using the crosslinking agent (E) together with an ink repellent, the liquid repellency tends to be improved.

(Solvent (F))

The curable resin composition according to the present invention preferably further contains a solvent (F). Accordingly, the viscosity of the composition is reduced, and the curable resin composition can be easily applied to the surface of the base material. As a result, a coating film of the curable resin composition having a uniform thickness can be formed.

As the solvent (F), a known solvent can be used. The solvent (F) may be used alone or in combination of two or more thereof.

Examples of the solvent (F) include alkylene glycol alkyl ethers, alkylene glycol alkyl ether acetates, alcohols, and solvent naphtha. Among them, at least one solvent selected from the group consisting of alkylene glycol alkyl ethers, alkylene glycol alkyl ether acetates, and alcohols is preferred, and at least one solvent selected from the group consisting of propylene glycol monomethyl ether acetate, propylene glycol monomethyl ether, diethylene glycol ethyl methyl ether, and 2-propanol is more preferred.

The content of the solvent (F) in the curable resin composition is preferably 50 mass % to 99 mass %, more preferably 60 mass % to 95 mass %, and particularly preferably 65 mass % to 90 mass %, with respect to the total amount of the composition.

(Colorant (G))

The curable resin composition according to the present invention contains a colorant (G) depending on the application, in the case where a light-shielding property is to be imparted to the cured film, particularly to the partition wall.

Examples of the colorant (G) include carbon black, aniline black, and an organic black pigment. Examples of the organic black pigment include the black pigments described in WO 2018/101314, anthraquinone-based black pigments, and perylene-based black pigments. Specific examples include C.I. Pigment Black 1, 6, 7, 12, 20, and 31. Another example is Irgaphor (product name, registered trademark) Black S 0100 CF (manufactured by BASF). Mixtures of an organic pigment and/or an inorganic pigment, such as a red pigment, a blue pigment, and a green pigment, can also be used.

The colorant (G) may be used alone or in combination of two or more thereof.

In the case where the colorant (G) is contained, the content of the colorant (G) in the total solid content of the curable resin composition according to the present invention is preferably 15 mass % to 65 mass %, and particularly preferably 20 mass % to 50 mass %. When the content is within the above range, the obtained curable resin composition has favorable sensitivity, and the partition wall formed has an excellent light-shielding property.

(Acidic Component (H))

The curable resin composition in the present invention may further contains an acidic component (H).

Examples of the acidic component (H) include sulfuric acid, nitric acid, phosphoric acid, a phosphoric acid compound (H1), acetic acid, oxalic acid, and maleic acid. Among them, nitric acid and the phosphoric acid compound (H1) are preferred. The acidic component (H) may be used alone or in combination of two or more thereof.

(Phosphoric Acid Compound (H1))

In the case where the curable resin composition in the present invention contains the phosphoric acid compound (H1), in addition to the effect of the acidic component to be described later, the adhesion to the base material can be improved. Examples of the phosphoric acid compound include mono(meth)acryloyloxyethyl phosphate, di(meth) acryloyloxyethyl phosphate, mono(2-(meth)acryloyloxyethyl caproate acid) phosphate, and bis(2-(meth)acryloyloxycthyl caproate acid) phosphate. Among them, mono(2-(meth)acryloyloxyethyl caproate acid) phosphate and bis(2-

(meth)acryloyloxyethyl caproate acid) phosphate are preferred, and mono(2-(meth)acryloyloxyethyl caproate acid) phosphate is particularly preferred.

In the case where the acidic component (H) is contained, the content of the acidic component (H) in the total solid content of the curable resin composition according to the present invention is preferably 0.01 mass % to 1 mass %, and particularly preferably 0.01 mass % to 0.5 mass %. When the content is within the above range, the obtained curable resin composition has favorable storage stability, and the coating film has favorable flatness.

(Other Components)

The curable resin composition in the present invention may further contain, if necessary, one or two or more of other additives such as a thermal crosslinking agent, a polymer dispersant, a dispersing aid, a silane coupling agent, fine particles, a curing accelerator, a thickener, a plasticizer, a defoamer, a leveling agent, a cissing inhibitor, and an ultraviolet absorber.

[Other Curable Resin Compositions]

The curable resin composition according to the present invention may be a positive photosensitive resin composition other than the above negative photosensitive resin composition.

The curable resin composition according to the present invention is obtained by mixing the above components in predetermined amounts.

Since the curable resin composition according to the present invention reduces the occurrence of outgassing after curing, it is possible to produce a cured resin film, particularly a partition wall, having excellent heat resistance by using the curable resin composition according to the present invention.

[Cured Resin Film]

In order to obtain a cured resin film using the curable resin composition according to the present invention, in the case where the curable resin composition according to the present invention has photocurability, for example, the cured resin film is obtained by applying the curable resin composition according to the present invention to a surface of a base material such as a substrate, performing drying if necessary to remove the solvent, and then performing curing by exposure. The obtained cured resin film exhibits a particularly remarkable effect in the case of being used in optical elements, particularly an organic EL display, a quantum dot display, a TFT array, a thin-film solar cell, a hard coat, and the like.

In the case where the curable resin composition according to the present invention is thermosetting, it is cured, for example, by being heated to a predetermined temperature to obtain a cured resin film. The obtained cured resin film is useful as a hard coat or the like.

[Partition Wall]

In the case where the curable resin composition according to the present invention is a negative photosensitive resin composition or a positive photosensitive resin composition, a partition wall made of a cured resin film using the composition is formed in a form of partitioning the surface of the substrate into a plurality of sections for forming dots. The partition wall can be obtained, for example, in the production of the above cured resin film, by masking a portion of a coating film, made of the curable resin composition, to be the section for forming dots before exposure, and then performing development after exposure.

In the case of a negative photosensitive resin composition, by development, portions not exposed by the masking are removed, and openings corresponding to the section for forming dots are formed together with the partition wall. In the case of a positive photosensitive resin composition, by development, the exposed portion due to the masking is removed, and openings corresponding to the section for forming dots are formed together with the partition wall.

The partition wall according to an embodiment of the present invention exhibits a particularly remarkable effect in the case of being used in optical elements, particularly a quantum dot display, a TFT array, and a thin-film solar cell.

Note that, before exposure, it is preferable to remove volatile components such as a solvent contained in the curable resin composition from the coating film by drying. Examples of the drying method include heat drying, reduced pressure drying, and reduced pressure heat drying. In the case of heat drying, the heating temperature is preferably 50° C. to 120° C., depending on the type of the solvent. In the case where the curable resin composition contains an ink repellent, the ink repellent migrates to the upper layer portion of the dry film during this drying process.

Examples of light for irradiation during exposure include: visible light; ultraviolet light; far ultraviolet light; excimer laser light such as KrF excimer laser light, ArF excimer laser light, $F_2$ excimer laser light, $Kr_2$ excimer laser light, KrAr excimer laser light, and $Ar_2$ excimer laser light; X-rays; and electron beams. The light for irradiation is preferably light having a wavelength of 100 nm to 600 nm, more preferably light having a wavelength of 300 nm to 500 nm, and particularly preferably light containing i-line (365 nm), h-line (405 nm), or g-line (436 nm). If necessary, light having a wavelength of 330 nm or less may be cut off.

Examples of the exposure method include full-surface exposure and scanning exposure. The same location may be exposed a plurality of times. At this time, exposure conditions for the plurality of times may or may not be the same.

In any of the above exposure methods, the exposure amount is preferably, for example, 5 mJ/cm$^2$ to 1,000 mJ/cm$^2$, more preferably 5 mJ/cm$^2$ to 500 mJ/cm$^2$, still more preferably 5 mJ/cm$^2$ to 300 mJ/cm$^2$, particularly preferably 5 mJ/cm$^2$ to 200 mJ/cm$^2$, and most preferably 5 mJ/cm$^2$ to 50 mJ/cm$^2$. Note that, the exposure amount is appropriately adjusted depending on the wavelength of the light for irradiation, the composition of the curable resin composition, the thickness of the coating film, and the like.

The exposure time per unit area is not particularly limited, and is designed based on the exposure power of the exposure device used, the required exposure amount, and the like. Note that, in the case of scanning exposure, the exposure time is calculated based on the scanning speed of light. The exposure time per unit area is generally about 0.01 to 60 seconds.

In the case where the curable resin composition is a negative photosensitive resin composition and contains the alkali-soluble resin (A) having an ethylenic double bond or the alkali-soluble monomer (A) having an ethylenic double bond, in the above exposed portion, radical polymerization of the alkali-soluble resin or monomer (A) occurs during exposure, and crosslinking of the alkali-soluble resin or monomer (A) via the polyfunctional thiol compound (C) occurs.

The development is performed using an alkaline developer, thereby forming the partition wall and the openings.

Note that, in the case where the curable resin composition contains an ink repellent, an ink repellent layer is formed on the uppermost layer including an upper surface of the partition wall, and below the ink repellent layer, a layer containing almost no ink repellent is formed by photocuring photocurable components, mainly an alkali-soluble resin, a polyfunctional thiol compound, and a crosslinking agent.

After the development, the partition wall may be further heated. The heating temperature is preferably 130° C. to 250° C. With the heating, curing of the partition wall is enhanced. In the case of containing an ink repellent, the ink repellent is more firmly fixed to the ink repellent layer.

Note that, in order to reliably obtain the ink-philic property of the openings, after the above heating, the substrate with the partition wall may be subjected to an ultraviolet light/ozone treatment in order to remove development residues of the curable resin composition that may be present in the openings.

The partition wall formed from the curable resin composition according to the present invention has a width of preferably, for example, 100 μm or less, and particularly preferably 20 μm or less. The distance between adjacent partition walls (pattern width) is preferably 300 μm or less, and particularly preferably 100 μm or less. The height of the partition wall is preferably 0.05 μm to 50 μm, and particularly preferably 0.2 μm to 10 μm.

The partition wall formed from the curable resin composition according to the present invention preferably has little unevenness at edges and excellent linearity when formed to the above width. Accordingly, even when the pattern is very fine, it is possible to form the pattern with high accuracy. When such a highly accurate pattern formation can be performed, the partition wall is particularly useful as a partition wall for an organic EL display, a quantum dot display, a TFT array, and a thin-film solar cell.

The partition wall according to the present invention can be used as a partition wall with an opening serving as an ink injection region when performing pattern printing by using the IJ method. In the case where the partition wall has ink repellency, when the partition wall is used with the opening formed to coincide with a desired ink injection region, the upper surface of the partition wall has favorable ink repellency, so that it is possible to prevent the ink from passing over the partition wall and being injected into an undesired opening, that is, into the ink injection region (it is possible to prevent contamination). In addition, since the opening surrounded by the partition wall has a favorable ink wetting and spreading property, it is possible to perform printing using the ink uniformly in a desired region without causing repellency or the like.

Further, in order to remove any high boiling point solvent remaining in an ink layer after printing, a baking treatment is generally performed in which the ink layer is heated under a pressure of, for example, about 133 Pa to 66,500 Pa at a temperature of, for example, about 150° C. to 300° C. for about 1 hour. Since the partition wall according to the present invention contains a polyfunctional thiol compound that satisfies specific conditions, little outgassing occurs during the baking treatment, so that there is little contamination in the ink layer, and an optical element having favorable properties can be produced.

The cured resin film obtained by using the curable resin composition according to the present invention has a water contact angle on the surface of preferably 60 degrees or more, and more preferably 80 degrees or more. In the case where the curable resin composition contains an ink repellent, the water contact angle is easily within the above range, and in particular, is easily to be 80 degrees or more. In addition, the above cured resin film has a contact angle of propylene glycol monomethyl ether acetate (PGMEA) on the surface of preferably 30 degrees or more, and more preferably 40 degrees or more. In particular, in the case where the curable resin composition contains an ink repellent, the PGMEA contact angle is easily within the above range, and in the case where a large PGMEA contact angle is required, the curable resin composition preferably contains an ink repellent.

Note that, the cured resin film is formed on a base material and is used as it is. In this embodiment, the surface of the cured resin film means the upper surface of the cured resin film. The ink repellency on the surface of the cured resin film is also exhibited on the upper surface of the partition wall. That is, whether the ink used in the IJ method is water-based or oil-based, the upper surface of the partition wall has sufficient ink repellency, and ink contamination and repellency can be sufficiently prevented at the openings.

Here, the contact angle is measured by using a static drop method in accordance with JIS R3257 "Test method for wettability of glass substrate surfaces" by placing water droplets or PGMEA droplets on three locations on the surface of the cured film and measuring the contact angle of each water droplet or PGMEA droplet. The droplet is 2 μL/droplet and the measurement is performed at 20° C. The contact angle is calculated as the average value of three measured values.

By using the partition wall according to the present invention, pattern printing by using the IJ method can be performed precisely as described above. Therefore, the partition wall according to the present invention is useful as a partition wall for an optical element including a plurality of dots formed on a surface of a substrate by using an IJ method and partition walls located between adjacent dots, particularly an organic EL display, a quantum dot display, a TFT array, and a thin-film solar cell.

[Optical Element]

In an optical element including the partition wall formed using the curable resin composition according to the present invention, since residues are reduced at the openings separated by the partition wall as described above, the ink can be uniformly wetted and spread without unevenness. Further, the partition wall has excellent adhesion to the base material. In the case where the adhesion between the partition wall and the base material is insufficient, for example, there is a problem that the ink diffuses to regions other than the openings. The optical element including the partition wall formed using the curable resin composition according to the present invention further has favorable properties such as little occurrence of outgassing during a baking treatment and little contamination in the ink layer since the polyfunctional thiol compound in the composition satisfies the specific conditions as described above.

The base material on which the partition wall is formed is appropriately selected from a base material made of various inorganic materials and organic materials depending on the type of the optical element. The partition wall has excellent adhesion to a base material made of an insulating material, for example, inorganic oxides such as a glass, aluminum oxide, tantalum oxide, and titanium oxide, inorganic nitrides such as silicon nitride and aluminum nitride, organic compounds such as a polyimide, a polyamide, a polyester, a polyacrylate, a photoradical polymerization-based or photocationic polymerization-based photocurable resin, a copolymer containing an acrylonitrile component, polyvinylphenol, polyvinyl alcohol, a novolac resin, and cyanoethyl pullulan, and also has excellent adhesion to a base material made of a conductive material, such as Al, Au, Ag, Pt, Pd, Cu, Cr, Mo, In, Zn, or Mg, and alloys or oxides containing these elements, an organic conductor such as a carbon nanotube, tin-doped indium oxide (ITO), and zinc-doped indium oxide (IZO).

When the optical element including the partition wall according to the present invention has improved adhesion of the partition wall to the base material and reduced residues at the openings, it is an optical element including accurately formed dots, particularly an organic EL, display, a quantum dot display, a TFT array, or a thin-film solar cell.

The organic EL display can be produced, for example, as follows, but is not limited to this.

A light-transmitting electrode such as ITO is formed on a light-transmitting substrate such as a glass by a sputtering method or the like. This light-transmitting electrode is patterned as necessary.

Next, the curable resin composition according to the present invention is used to form partition walls in a lattice shape in a plan view along outlines of dots by photolithography including coating, exposure, and development.

Next, an electrical charge injection material solution and/or an electrical charge transport material solution is applied into the dots by the IJ method as necessary, and dried, and then a light emitting material solution that electrically emits light is applied and dried to prepare a module. Accordingly, an organic EL display having excellent color reproducibility is obtained.

The TFT array element is an element in which a plurality of dots are disposed in a matrix in a plan view, each dot is provided with a pixel electrode and a TFT as a switching element for driving the pixel electrode, and an inorganic semiconductor layer or an organic semiconductor layer is used as a semiconductor layer including a channel layer of the TFT. The organic TFT array element is provided as a TFT array substrate, for example, in a liquid crystal element.

The TFT array can be produced, for example, as follows, but is not limited to this.

A gate electrode made of aluminum or an alloy thereof is formed on a light-transmitting substrate such as a glass by a sputtering method or the like. This gate electrode is patterned as necessary.

Next, a gate insulating film made of silicon nitride or the like is formed by a plasma CVD method or the like. A source electrode and a drain electrode may be formed on the gate insulating film. The source electrode and the drain electrode can be prepared by forming a metal thin film of aluminum, gold, silver, copper, or an alloy thereof by vacuum deposition or sputtering, for example.

Examples of the method for patterning the source electrode and the drain electrode include a method in which a metal thin film is formed, then a resist is applied, exposure and development are performed to make the resist remain in a portion to form electrodes, then the exposed metal is removed using phosphoric acid or aqua regia, and finally the resist is removed. In the case where a metal thin film such as gold is formed, examples of the method include a method in which a resist is applied in advance, exposure and development are performed to make the resist remain in a portion where electrodes are not desired to be formed, then a metal thin film is formed, and then a photoresist is removed along with the metal thin film. In addition, the source electrode and the drain electrode may be formed by a method such as inkjet printing using a nano-colloid of a metal such as silver or copper.

[Interlayer Insulation Film]

In the case of forming an interlayer insulation film using the curable resin composition according to the present invention, due to a crosslinked structure formed by the thiol-ene reaction between the polyfunctional thiol compound and the crosslinking agent, the tensile breaking strength is high, the film stress is low, and the occurrence of cracks during the formation of the interlayer insulation film can be prevented. Further, even when a heat treatment is performed in a post-step after the formation of the interlayer insulation film, there is little outgassing, and it is possible to maintain a small dielectric constant.

EXAMPLES

Hereinafter, the present invention is described with reference to Examples, but the present invention is not limited to these.

Each measurement was performed by the following method.

[Electrical Charge]

A compound in which all —SH groups in a polyfunctional thiol compound were substituted with —S—$C_2H_5$, that is, a reactant of a polyfunctional thiol compound and ethylene, was subjected to natural population analysis to obtain the electrical charge density.

The natural population analysis was performed using quantum chemical calculation software Gaussian 16, after structural optimization by DFT (B3LYP/6-31G (d)) using NBO version 3.1 (NBO Version 3.1, E. D. Glendening, A. E. Reed, J. E. Carpenter, and F. Weinhold).

[Number Average Molecular Weight (Mn) and Mass Average Molecular Weight (Mw)]

The number average molecular weight (Mn) and the mass average molecular weight (Mw) were measured by gel permeation chromatography using polystyrene as a standard substance. As the gel permeation chromatography, HPLC-8220GPC (manufactured by Tosoh Corporation) was used. As the column, three Shodex LF-604 columns connected together were used. As the detector, an RI detector was used. As the standard substance, EasiCal PS1 (manufactured by Polymer Laboratories) was used. Further, when measuring the number average molecular weight and the mass average molecular weight, the column was kept at 37° C., tetrahydrofuran was used as an eluent, the flow rate was 0.2 mL/min, and 40 μL of a 0.5% solution of a measurement sample in tetrahydrofuran was injected.

[Content of Fluorine Atom]

The fluorine atom content was calculated by $^{19}F$ NMR measurement using 1,4-ditrifluoromethylbenzene as a standard substance.

[Acid Value]

The acid value was theoretically calculated based on the blending ratio of raw materials.

The abbreviations for the compounds used in the following examples are shown below.

(Alkali-soluble Resin (A))

A2: a resin obtained by reacting a bisphenol A type epoxy resin with acrylic acid and then with 1,2,3,6-tetrahydrophthalic acid anhydride to introduce an acryloyl group and a carboxy group into the resin, and purifying the resin with hexane (alkali-soluble resin (A2), acid value: 50 mgKOH/g). Note that, in the production of the curable resin composition, a composition of the alkali-soluble resin (A2) (solid content: 70 mass %, PGMEA: 30 mass %) was used.

(Photopolymerization Initiator (B))
  B-1: 2-methyl-1-[4-(methylthio)phenyl]-2-morpholino-propan-1-one
  EAB: 4,4'-bis(diethylamino)benzophenone (Polyfunctional Thiol Compound (C))
  C1: pentaerythritol tetra(mercaptoacetate)
  C2: trimethylolpropane tris(mercaptoacetate)
  C3: 1,3,5-tris(2-mercaptopropyloxyethyl)-1,3,5-triazine-2,4,6(1H,3H,5H)-trione
  CR1: pentaerythritol tetra(3-mercaptopropionate)
  CR2: trimethylolpropane tris(3-mercaptopropionate)
  CR3: 1,3,5-tris(3-mercaptobutyryloxyethyl)-1,3,5-triazine-2,4,6(1H,3H,5H)-trione

TABLE 1
| | Central skeleton | Rs structure |
|---|---|---|
| C1 | 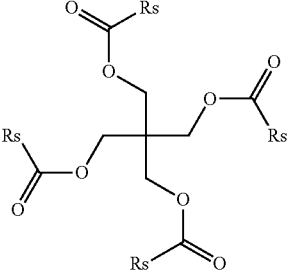 (2-6) | 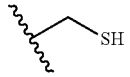 |
| C2 | 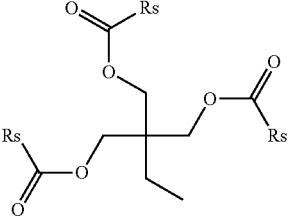 (2-4) 1p;2p | 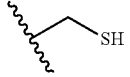 [SMILES: *CS] |
| C3 | 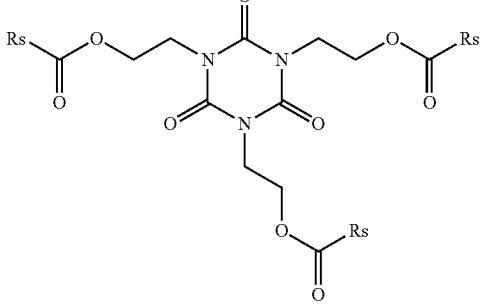 (2-2) | 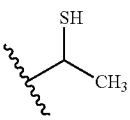 |
TABLE 2
| | Central skeleton | Rs structure |
|---|---|---|
| CR1 | 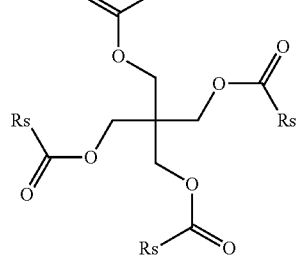 (2-6) | 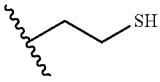 [SMILES: *CCS] |

TABLE 2-continued

| | Central skeleton | Rs structure |
|---|---|---|
| CR2 | (2-4) structure with pentaerythritol-like central skeleton with three Rs ester groups and an ethyl group | ~~~CH₂CH₂SH |
| CR3 | (2-2) triazinetrione (isocyanurate) central skeleton with three Rs ester groups via ethylene linkers | ~~~CH(CH₃)CH₂SH (structure showing CH with CH₃ and SH) |

The polyfunctional thiol compounds C1 to C3 and CR1 to CR3 were synthesized with reference to the method described in JP2011-84479A.

(Electrical Charge)

The electrical charge properties for each polyfunctional thiol compound are shown in the table below.

TABLE 3

| | | Property (1): there is no CH structure two atoms next to S atom | Property (2): in reactant with ethylene, electrical charge of hydrogen atom bonded to carbon atom two atoms next to S atom (maximum value) |
|---|---|---|---|
| Poly- | C1 | No | — |
| functional | C2 | No | — |
| thiol | C3 | Yes | 0.25157 |
| compound | CR1 | Yes | 0.26972 |
| | CR2 | Yes | 0.26954 |
| | CR3 | Yes | 0.27240 |

(Ink Repellent (D))

An ink repellent (D2-1) synthesized using the following raw material compounds by the following method was used.
(Raw material compounds)
  Compound (s1-1): $F(CF_2)_6CH_2CH_2Si(OCH_3)_3$ (produced by a known method)
  Compound (s2-1): $Si(OC_2H_5)_4$
  Compound (s3-1): $CH_2=CHCOO(CH_2)_3Si(OCH_3)_3$
[Synthesis of Ink Repellent (D2-1)]

To a 1,000 cm³ three-neck flask equipped with a stirrer, 15.0 g of the compound (s1-1), 20.0 g of the compound (s2-1), and 27.0 g of the compound (s3-1) were charged to obtain a hydrolyzable silane compound mixture. Next, 284.3 g of IPA (2-propanol) was added to this mixture to prepare a raw material solution.

To the obtained raw material solution, 30.0 g of a 1% nitric acid aqueous solution was added dropwise. After the dropwise addition was completed, the resultant was stirred at 40° C. for 5 hours to obtain a solution of the ink repellent (D2-1) in IPA (ink repellent (D2-1) concentration: 10 mass %, hereinafter also referred to as an "ink repellent (D2-1) solution"). Note that, after the reaction was completed, the components in the reaction solution were measured by gas chromatography, and it was found that the amounts of the raw material compounds were below the detection limit. The obtained ink repellent (D2-1) had a number average molecular weight (Mn) of 1,200, a mass average molecular weight (Mw) of 1,310, and a measured value for the content of the fluorine atom of 21.0 mass %.

(Crosslinking Agent (E))
  DPHA: dipentaerythritol hexaacrylate
  I-11: triallyl isocyanurate
(Solvent)
  PGME: propylene glycol monomethyl ether
  EDM: diethylene glycol ethyl methyl ether
  PGMEA: propylene glycol monomethyl ether acetate Examples 1 to 8: Production of Curable Resin Composition and Production of Cured Resin Film (Production of Curable Resin Composition)

The above alkali-soluble resin (A), photopolymerization initiator (B), polyfunctional thiol compound (C), ink repellent (D), crosslinking agent (E), and solvent were charged into a 200 cm³ stirring vessel so as to have the composition shown in Table 4 below, and stirred for 3 hours to produce each curable resin composition (negative photosensitive resin composition).

(Production of Cured Film)

A glass substrate of 10 cm square was subjected to ultrasonic cleaning with ethanol for 30 seconds, and then subjected to a UV/O₃ treatment for 5 minutes. For the UV/O₃ treatment, PL2001N-58 (manufactured by Sen Engineering Co., Ltd.) was used as a UV/O$_3$ generator. The optical power (optical output) converted to 254 nm was 10 mW/cm$^2$.

Each of the curable resin compositions obtained above was applied to the cleaned surface of the glass substrate using a spinner, and then dried on a hot plate at 100° C. for 2 minutes to form a dry film having a thickness of 2.4 μm. The entire surface of the obtained dry film was irradiated with UV light from an ultra-high pressure mercury lamp having an exposure power (exposure output) of 300 mW/cm$^2$ converted to 365 nm. In this method, two types of cured films were produced by adjusting the irradiation time such that the exposure amount was 50 mJ/cm$^2$. Note that, in either case, light having a wavelength of 330 nm or less was cut off during exposure.

Next, the glass substrate after the above exposure treatment was immersed in a 2.38% tetramethylammonium hydroxide aqueous solution for 60 seconds, rinsed with water, and then dried. The dried product was then heated on a hot plate at 230° C. for 60 minutes to obtain a cured film without openings.

(Outgassing Analysis)

A primary trap tube, containing 8 glass substrates with cured film described above cut to 1 cm×4 cm, was baked at 230° C. for 60 minutes using a P&T-GCMS device including "HS-20TRAP" manufactured by Shimadzu Corporation and "GCMS-QP2020" manufactured by Shimadzu Corporation, and the generated gas was collected in a secondary trap tube cooled to −10° C. Thereafter, the secondary trap tube was heated to 250° C., and a chromatogram of the released gas was measured. As a standard sample, triallyl isocyanurate was charged into the primary trap tube, and the chromatogram was measured in the same manner as above. In the obtained chromatogram, the area of the peak detected after the retention time of benzyl phenyl ether, i.e., a solvent commonly used in IJ inks, was normalized according to the following equation (1) to calculate the amount of outgassing.

$$\text{Amount of outgassing} = [A/B] \times C \quad (1)$$

A: area of peak detected after retention time of benzyl phenyl ether in chromatogram obtained by measuring sample B: area of peak in chromatogram obtained by measuring standard sample C: weight of standard sample charged into primary trap tube The amount of outgassing was evaluated according to the following criteria.

A: the amount of outgassing is less than 0.1 μg

C: the amount of outgassing is 0.1 μg or more (Ink Repellency)

The water contact angle and the PGMEA contact angle on the upper surface of the cured film obtained above were measured by the following method to evaluate the ink repellency.

The water contact angle or the PGMEA contact angle was measured by using a static drop method in accordance with JIS R3257 "Test method for wettability of glass substrate surfaces" by placing water droplets or PGMEA droplets on three locations on the upper surface of the cured film and measuring the contact angle of each water droplet or PGMEA droplet. The droplet was 2 μL/droplet and the measurement was performed at 20° C. The contact angle was calculated as the average value of three measured values.

A: the average value of contact angles is 40° or more

C: the average value of contact angles is less than 40°

(Storage Stability)

The curable resin compositions shown in Table 4 below were allowed to stand for 20 days in an environment of 23° C. and a relative humidity of 55%. The viscosity of each of the curable resin compositions before and after the above standing was measured at 25° C. using "TVE-35L" manufactured by TOKISANGYO, and the absolute value of the rate of change in viscosity was calculated. It can be said that the smaller the rate of change, the higher the storage stability of the curable resin composition.

A: the absolute value of the rate of change in viscosity is less than 5%

B: the absolute value of the rate of change in viscosity is 5% or more and less than 10%

C: the absolute value of the rate of change in viscosity is 10% or more

The results of the above evaluations are shown in the table below.

Note that, Example 1 to Example 4 are Inventive Examples, and Example 5 to Example 8 are Comparative Examples.

TABLE 4

| | Component | | Example 1 | Example 2 | Example 3 | Example 4 | Example 5 | Example 6 | Example 7 | Example 8 |
|---|---|---|---|---|---|---|---|---|---|---|
| Solid content composition (mass %) | Alkali-soluble resin (A) | A2 | 50 | 50 | 50 | 50 | 50 | 50 | 50 | 50 |
| | Photopolymerization initiator (B) | B-1 | 5 | 5 | 5 | 5 | 5 | 5 | 5 | 5 |
| | | EAB | 1.5 | 1.5 | 1.5 | 1.5 | 1.5 | 1.5 | 1.5 | 1.5 |
| | Thiol compound (C) | C1 | 5.7 | — | — | — | — | — | — | — |
| | | C2 | — | 6.3 | — | — | — | — | — | — |
| | | C3 | — | — | 9.3 | 9.3 | — | — | — | — |
| | Thiol compound (CR) | CR1 | — | — | — | — | 6.5 | — | — | — |
| | | CR2 | — | — | — | — | — | 7 | — | — |
| | | CR3 | — | — | — | — | — | — | 10 | — |
| | Ink repellent (D) | D2-1 | 0.5 | 0.5 | 0.5 | 0.5 | 0.5 | 0.5 | 0.5 | 0.5 |
| | Crosslinking agent (E) | DPHA | 37.3 | 36.7 | 33.7 | 10.7 | 36.5 | 36 | 33 | 43 |
| | | I-11 | — | — | — | 23 | — | — | — | — |
| Solid content concentration (mass %) | | | 18 | 18 | 18 | 18 | 18 | 18 | 18 | 18 |
| Solvent composition (mass %) | | EDM | 44 | 44 | 44 | 44 | 44 | 44 | 44 | 44 |
| | | Water | 4 | 4 | 4 | 4 | 4 | 4 | 4 | 4 |

TABLE 4-continued

| Component | | Example 1 | Example 2 | Example 3 | Example 4 | Example 5 | Example 6 | Example 7 | Example 8 |
|---|---|---|---|---|---|---|---|---|---|
| | PGME | 45 | 45 | 45 | 45 | 45 | 45 | 45 | 45 |
| | PGMEA | 7 | 7 | 7 | 7 | 7 | 7 | 7 | 7 |
| Evaluation item | Outgassing | A | A | A | A | C | C | C | A |
| | Ink repellency | A | A | A | A | A | A | A | C |
| | Storage stability | B | B | A | A | B | B | A | A |

As found from the above results, from the curable resin compositions in Example 1 to Example 4, which contained a polyfunctional thiol compound satisfying the specific conditions, a cured film having a small amount of outgassing and excellent ink repellency was obtained. It was also found that the storage stability in Example 3 and Example 4, in which the SH group in the polyfunctional thiol compound was secondary, is higher than that in Example 1 and Example 2, in which the SH group was primary. In the curable resin compositions in Example 5 to Example 7 in which the polyfunctional thiol compound did not satisfy the specific conditions, a large amount of outgassing occurred. In the curable resin composition in Example 8, which did not contain a polyfunctional thiol compound, the amount of outgassing was small, but the ink repellency was poor.

Although the present invention has been described in detail with reference to specific embodiments, it is apparent to those skilled in the art that various changes and modifications can be made without departing from the spirit and scope of the present invention. The present application is based on a Japanese Patent Application (Japanese Patent Application No. 2022-017305) filed on Feb. 7, 2022, and the contents thereof are incorporated herein by reference.

INDUSTRIAL APPLICABILITY

The curable resin composition according to the present invention can be suitably used as a composition for forming a partition wall in the case of performing pattern printing by an IJ method in optical elements such as an organic EL display, a quantum dot display, a TFT array, or a thin-film solar cell.

The curable resin composition according to the present invention can also be suitably used as a composition for forming a hard coat on optical parts and the like.

The curable resin composition according to the present invention can further be suitably used as a composition for forming an interlayer insulation film in semiconductor members and the like.

The invention claimed is:

1. A curable resin composition, comprising:
a polyfunctional thiol compound; and
an alkali-soluble resin having an ethylenic double bond or an alkali-soluble monomer having an ethylenic double bond,
wherein the polyfunctional thiol compound satisfies the following property (1) or property (2):
(1) there is no CH structure two atoms next to an S atom;
(2) in a compound obtained by adding ethylene to all SH groups in the polyfunctional thiol compound, an electrical charge of a hydrogen atom bonded to a carbon atom which is two atoms next to an S atom is 0.265 or less, as determined by natural population analysis after structural optimization based on a density functional theory.

2. The curable resin composition according to claim 1, wherein an SH group in the polyfunctional thiol compound is at least one of a secondary SH group and a tertiary SH group.

3. The curable resin composition according to claim 1, wherein the polyfunctional thiol compound has a structure represented by the following formula (1):

wherein definitions of symbols in the above formula are as follows:
X: divalent organic group selected from —C(=O)—, —C(=O)O—, —C(R)(C≡N)—, and —C(R)(NR$_2$)
R: each independently hydrogen atom or monovalent organic group having 1 to 5 carbon atoms
dashed line: hydrogen bond
A: cyclic structure having 5 to 7 members.

4. The curable resin composition according to claim 1, wherein the polyfunctional thiol compound has a 2-mercaptoalkyl ester structure shown in the following formula (1-11a) or a 4-mercaptoalkyl ester structure shown in the following formula (1-11b):

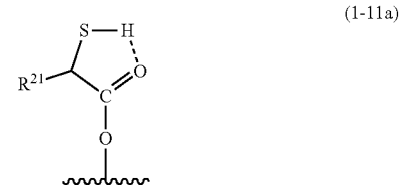

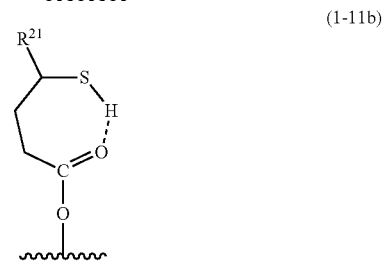

wherein definitions of symbols in the above formula are as follows:

$R^{21}$; methyl group or ethyl group
dashed line: hydrogen bond.

5. The curable resin composition according to claim 1, wherein the polyfunctional thiol compound has a 2-mercaptopropionate ester structure shown in the following formula (1-11a-i) or a 4-mercaptopentanoate ester structure shown in the following formula (1-11b-i)

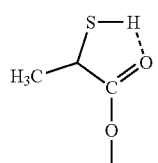
(1-11a-i)

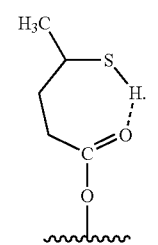
(1-11b-i)

6. The curable resin composition according to claim 1, wherein the polyfunctional thiol compound comprises one or more compounds selected from compounds represented by the following formula (2-2), formula (2-4), formula (2-5), and formula (2-6):

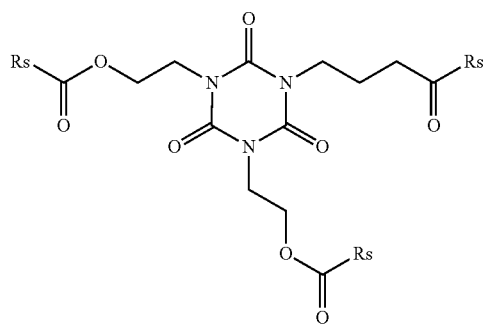
(2-2)

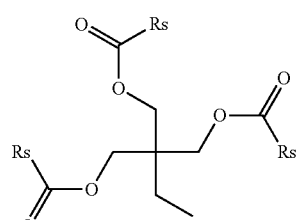
(2-4)

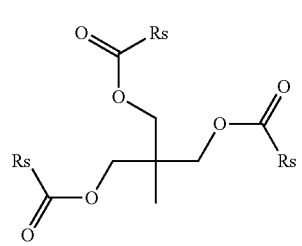
(2-5)

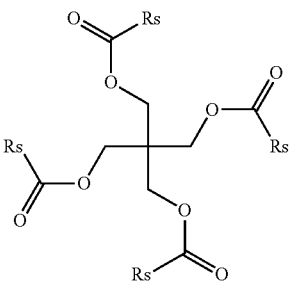
(2-6)

wherein definitions of symbols in the above formula are as follows:

Rs: each independently monovalent group represented by any of the following formula (Rs-1) to formula (Rs-3)

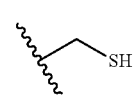
(Rs-1)

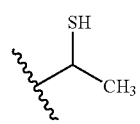
(Rs-2)

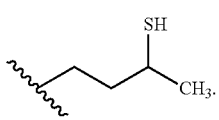
(Rs-3)

7. The curable resin composition according to claim 1, further comprising a colorant.

8. The curable resin composition according to claim 1, further comprising an ink repellent.

9. The curable resin composition according to claim 1, further comprising a polymerizable monomer having a plurality of allyl groups.

10. The curable resin composition according to claim 1, which is used for a partition wall, a hard coat, or an interlayer insulation film.

11. A cured resin film formed by the curable resin composition according to claim 1.

12. A partition wall comprising the cured resin film according to claim 11, wherein the partition wall is formed in a form of partitioning a surface of a base material into a plurality of sections for forming dots.

13. An optical element comprising:
a plurality of dots on a surface of a base material; and
a partition wall located between adjacent dots,
wherein the partition wall is the partition wall according to claim 12.

* * * * *